United States Patent
Li

(10) Patent No.: US 12,526,756 B2
(45) Date of Patent: Jan. 13, 2026

(54) CELL SWITCHING METHOD, TERMINAL DEVICE, AND STORAGE MEDIUM

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 485 days.

(21) Appl. No.: 17/945,710

(22) Filed: Sep. 15, 2022

(65) Prior Publication Data

US 2023/0007541 A1 Jan. 5, 2023

Related U.S. Application Data

(63) Continuation of application No. PCT/CN2020/080343, filed on Mar. 20, 2020.

(51) Int. Cl.
| H04W 56/00 | (2009.01) |
| H04W 36/00 | (2009.01) |
| H04W 36/08 | (2009.01) |
| H04W 84/06 | (2009.01) |

(52) U.S. Cl.
CPC ...... H04W 56/001 (2013.01); H04W 36/0011 (2013.01); H04W 36/08 (2013.01); H04W 84/06 (2013.01)

(58) Field of Classification Search
CPC ........... H04W 56/001; H04W 36/0011; H04W 36/08; H04W 84/06
USPC .......................... 370/329, 331, 332; 455/450
See application file for complete search history.

(56) References Cited

U.S. PATENT DOCUMENTS

| 2015/0181476 | A1* | 6/2015 | Yang ............... H04W 36/00 455/454 |
| 2016/0192261 | A1 | 6/2016 | Wang et al. |
| 2019/0387446 | A1* | 12/2019 | Xu ............... H04W 36/0061 |
| 2020/0008113 | A1 | 1/2020 | Chen |
| 2020/0275505 | A1* | 8/2020 | Lei ............... H04L 1/1825 |
| 2020/0314903 | A1* | 10/2020 | Jang ............... H04W 24/08 |
| 2021/0022057 | A1* | 1/2021 | Sabouri-Sichani ........... H04W 36/0079 |

(Continued)

FOREIGN PATENT DOCUMENTS

| WO | 2016090124 A1 | 6/2016 |
| WO | 2019193891 A1 | 10/2019 |
| WO | 2020001615 A1 | 1/2020 |

OTHER PUBLICATIONS

3GPP TSG-RAN WG2 Meeting #108 R2-1914724 Ericsson "Reduced User Data Interruption for NTN" Nov. 22, 2019, hereinafter Ericsson (Year: 2019).*

(Continued)

*Primary Examiner* — Kwang B Yao
*Assistant Examiner* — Bradley D Lytle, Jr.
(74) *Attorney, Agent, or Firm* — Ladas & Parry LLP

(57) ABSTRACT

A cell switching method, a terminal device and a storage medium are provided. The method comprises: when a terminal device executes cell switching, the terminal device keeping an uplink in a source cell at a moment other than the moment for sending a first message; and the terminal device keeping a downlink in the source cell at a moment other than the moment for downlink synchronization with a target cell.

20 Claims, 10 Drawing Sheets

(56) References Cited

U.S. PATENT DOCUMENTS

| | | | |
|---|---|---|---|
| 2021/0099933 A1 | 4/2021 | Matsuda et al. | |
| 2021/0282179 A1* | 9/2021 | Lei | H04W 52/0216 |
| 2022/0007455 A1* | 1/2022 | Hong | H04L 1/1883 |
| 2022/0279395 A1* | 9/2022 | Zirwas | H04W 36/08 |
| 2023/0070647 A1 | 3/2023 | Matsuda et al. | |

OTHER PUBLICATIONS

OPPO: "Left issues on handover procedure for NTN", 3GPP Draft; R2-1915170, 3rd Generation PartnershipProject (3GPP), Mobile Competence Centre ; 650, Route Des Lucioles; F-06921 Sophia-Antipolis Cedex;France vol. RAN WG2, No. Chongqing, China; Oct. 14, 2019-Oct. 18, 2019 Nov. 8, 2019 (Nov. 8, 2019), XP051817066, Retrieved from the Internet:U RL:https://ftp.3gpp.org/tsg_ran/WG2_RL2/TSG R2_108/Docs/R2-1915170.zip R2-1915170.doc[retrieved on Nov. 8, 2019]. 3 pages.

Mediatek Inc: "Views on User Plane Timers in NTN", 3GPP Draft; R2-1905705_Views on User Plane Timers INNTN, 3rd Generation Partnership Project (3GPP), Mobile Competence Centre • 650 Route Des Lucioles •F-06921 Sophia-Antipolis Cedex; France vol. RAN WG2, No. Xi'an, China; May 13, 2019-May 17, 2019 May 13, 2019(May 13, 2019), XP051729204, Retrieved from the Internet:URL:http://www.3gpp.org/ftp/Meetings%5F3GPP%5FSYNC/RAN2/Docs/R2%2D1 905705%2 Ezip[retrieved on May 13, 2019]. 3 pages.

Supplementary European Search Report in the European application No. 20925939.9, mailed on Apr. 6, 2023. 11 pages.

Ericsson. "Make before Break for NTN" 3GPP TSG-RAN WG2 #107bis R2-1912595, Oct. 3, 2019 (Oct. 3, 2019), sections 1-5.

Ericsson. "Reduced User Data Interruption for NTN" 3GPP TSG-RAN WG2 #108 R2-1914724. Nov. 13, 2019 (Nov. 13, 2019), sections 1-5.

International Search Report in the international application No. PCT/CN2020/080343, mailed on Dec. 15, 2020.

English translation of the Written Opinion of the International Search Authority in the international application No. PCT/CN2020/080343, mailed on Dec. 15, 2020.

"3rd Generation Partnership Project; Technical Specification Group Radio Access Network; NR; Physical layer procedures for control (Release 16)", 3GPP TS 38.213 V16.0.0 (Dec. 2019), section 8.1.

"3rd Generation Partnership Project; Technical Specification Group Radio Access Network; NR; NR and NG-RAN Overall Description; Stage 2 (Release 16)", 3GPP TS 38.300 V16.0.0 (Dec. 2019), section 9.2.6.

First Office Action of the European application No. 20925939.9, issued on Feb. 17, 2025. 6 pages.

* cited by examiner

In case that a terminal device performs a cell switching, the terminal device keeps an uplink in a source cell at a time other than sending a first message — S301

FIG. 4

In case that a terminal device performs a cell switching, the terminal device keeps a downlink in a source cell at a time other than downlink synchronization with a target cell  — S401

FIG. 5

CELL SWITCHING METHOD, TERMINAL DEVICE, AND STORAGE MEDIUM

CROSS-REFERENCE TO RELATED APPLICATION

This is a continuation application of International Patent Application No. PCT/CN2020/080343, filed on Mar. 20, 2020, the contents of which are hereby incorporated by reference in their entirety.

BACKGROUND

In a Non Terrestrial Network (NTN), how to reduce the interrupted time of data transmission and improve the efficiency of data transmission in the process of performing cell switching by a terminal device is not yet clear.

SUMMARY

The disclosure relates to the technical field of wireless communication, and in particular to a method for cell switching, a terminal device, and a base station.

The embodiments of the disclosure provide a method for cell switching, a terminal device, and a storage medium, so that when the terminal device performs the cell switching, the interrupted time of data transmission may be reduced and the efficiency of data transmission may be improved.

In a first aspect, the embodiments of the disclosure provide a method for cell switching, which may include that: in case that a terminal device performs the cell switching, the terminal device keeps an uplink in a source cell at a time other than sending a first message.

In a second aspect, the embodiments of the disclosure provide a method for cell switching, which may include that: in case that a terminal device performs the cell switching, an uplink is kept in a source cell at a time other than sending a first message.

In a third aspect, the embodiments of the disclosure provide a terminal device, which may include: a processor, a memory configured to store a computer-executable instruction; and a network interface. The processor is configured to enable the terminal device to keep an uplink in a source cell at a time other than sending a first message in case that the terminal device performs the cell switching.

BRIEF DESCRIPTION OF THE DRAWINGS

FIG. 4 illustrates an optional processing flowchart of a method for cell switching of the embodiments of the disclosure.

FIG. 5 illustrates another optional processing flowchart of a method for cell switching of the embodiments of the disclosure.

DETAILED DESCRIPTION

Figure 1:
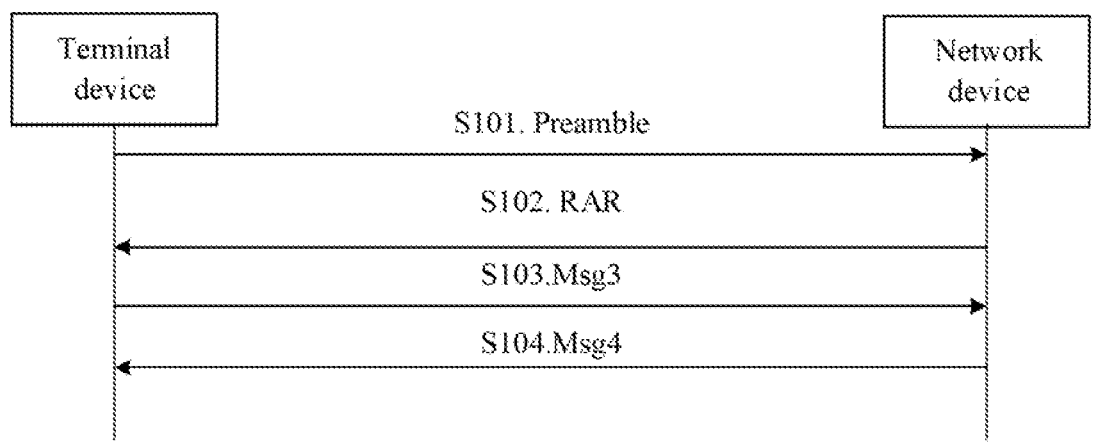
FIG. 1 illustrates a processing flowchart of a second type of RACH of the disclosure.

In order to provide a more detailed understanding of the features and technical contents of the embodiments of the disclosure, the implementation of the embodiments of the disclosure will be described in detail below with reference to the accompanying drawings, and the accompanying drawings are for illustrative purposes only and are not intended to limit the embodiments of the disclosure.

Before the embodiments of the disclosure are described in detail, a brief description is given below.

A NTN provides a communication service for terrestrial users by means of satellite communication. Compared with terrestrial cellular network communication, the satellite communication has many unique advantages. Firstly, the satellite communication is not restricted by the user's regions, for example, regions which are not covered by general land communication and may not be provided with a communication device, such as oceans, mountains, deserts, or the like, or the regions which may not be covered by communication due to sparse population. For the satellite communication, since one satellite may cover a large area of the ground, and a satellite may orbit around the earth, so that every corner of the earth may be covered with the satellite communication theoretically. Secondly, the satellite communication has relatively high social value. The satellite communication may cover remote mountain areas and poor and backward countries or regions at relatively low cost, so that people in these regions may enjoy advanced voice communication and mobile Internet technologies, which is conducive to narrowing the digital divide with developed regions and promoting development in these regions. Thirdly, the satellite communication distance is long, and the cost of communication may not be significantly increased with the increase of the communication distance. Finally, the satellite communication has high stability and is not restricted by natural disasters.

The communication satellite is classified into a Low-Earth Orbit (LEO) satellite, a Medium-Earth Orbit (MEO) satellite, a Geostationary Earth Orbit (GEO) satellite, a High Elliptical Orbit (HEO) satellite, and the like according to different orbital altitudes. A brief description of the LEO and the GEO is given below.

The orbital altitude of the LEO ranges from 500 km to 1500 km, and the corresponding orbital period is about 1.5 hours to 2 hours. The signal propagation delay of single-hop communication between terminal devices is generally less than 20 ms. The maximum satellite visual time is 20 minutes. The signal propagation distance is short, the link loss is less, and the requirements for transmitting power of the terminal device are not high.

The orbital altitude of the GEO is 35,786 km and the rotation period around the earth is 24 hours. The signal propagation delay of single-hop communication between the terminal devices is generally 250 ms. In order to ensure the coverage of the satellite and improve the system capacity of the entire satellite communication system, the satellite covers the ground by using multiple beams, and one satellite may form dozens or even hundreds of beams to cover the ground. One satellite beam may cover the ground region with the diameter of tens to hundreds of kilometers.

In order to ensure the coverage of the satellite and improve the system capacity of the entire satellite communication system, the satellite covers the ground by using multiple beams, and one satellite may form dozens or even hundreds of beams to cover the ground. One satellite beam may cover the ground region with the diameter of tens to hundreds of kilometers.

Before the detailed description of a method for cell switching provided by the embodiments of the disclosure, a first type of RACH and a second type of RACH are briefly described respectively.

In a New Radio (NR) system, a RACH includes: the first type of RACH and the second type of RACH. Herein, in the first type of RACH, two information exchanges need to be performed between the terminal device and a network device. Therefore, the first type of RACH is also called 2-steps RACH, in the second type of RACH, four information exchanges need to be performed between the terminal device and the network device. Therefore, the second type of RACH is also called 4-steps RACH. According to different RACH modes, the RACH includes Contention-Based Random Access (CBRA) and Contention-Free Random Access (CFRA). According to different RACH types, the RACH includes a first type of RACH and a second type of RACH. The first type of RACH and the second type of RACH are respectively briefly described below.

The processing flow of the second type of RACH, as illustrated in FIG. 1, includes the following four operations.

At S101, a terminal device sends a RACH Preamble to a network device through a Message 1 (Msg 1).

The terminal device sends the selected Preamble on a selected time domain resource of Physical Random Access Channel (PRACH). The network device may estimate the size of uplink grant required by the terminal device to transmit an Msg3 and uplink Timing according to the Preamble.

At S102, after detecting that the terminal device sends the Preamble, the network device sends a Random Access Response (RAR) message to the terminal device through a Msg2, so as to inform the terminal device of the uplink resource information which is used when sending the Msg3, allocate a Radio Network Temporary identity (RNTI) for the terminal device, provide a time advance command for the terminal device, and the like.

After sending the Msg1, the terminal device starts a RAR window, and detects a Physical Downlink Control Channel (PDCCH) in the RAR window. The detected PDCCH is scrambled with RA-RNTI.

At S103, after receiving the RAR message, the terminal device sends the Msg3 in the uplink resource indicated in the RAR message.

Herein, the message of Msg3 is mainly used to notify the network device what event triggers the RACH process. For example, if it is an initial RACH event, the Msg3 may carry an ID of the terminal device and an establishment cause, and if it is a Radio Resource Control (RRC) reestablishment event, the Msg3 may carry an identity of the terminal device in a connected state and the establishment cause.

Meanwhile, the ID carried by the Msg3 may enable the contention collision to be resolved in operation S104.

At S104, the network device sends an Msg4 including a contention resolution message to the terminal device, and allocates an uplink transmission resource to the terminal device simultaneously.

When receiving the Msg4 from the network device, the terminal device may detect whether a specific temporary identity of the terminal device which is sent in the Msg3 by the terminal device is included in the contention resolution message sent by a base station. If the specific temporary identity of the terminal device is included in the contention resolution message, it indicates that the RACH process of the terminal device is successful, otherwise, the RACH process fails, and the terminal device needs to initiate the RACH process from the first step again.

Another function of the Msg4 is to send a RRC configuration message to the terminal device.

The contention collision resolution includes two ways. Herein, the first way is that: if the terminal device carries a Cell Radio Network Temper Identity (C-RNTI) in the Msg3, the Msg4 is scheduled by the PDCCH scrambled with the C-RNTI. The second way is that: if the terminal device does not carry the C-RNTI in the Msg3, for example, the terminal device is initial access, the Msg4 is scheduled by the PDCCH scrambled with the TC-RNTI. Collision resolution is achieved by the terminal device receiving a Physical Downlink Shared Channel (PDSCH) of the Msg4 to match with a Service Data Unit (SDU) of a Common Control Channel (CCCH) in the PDSCH.

Figure 2:
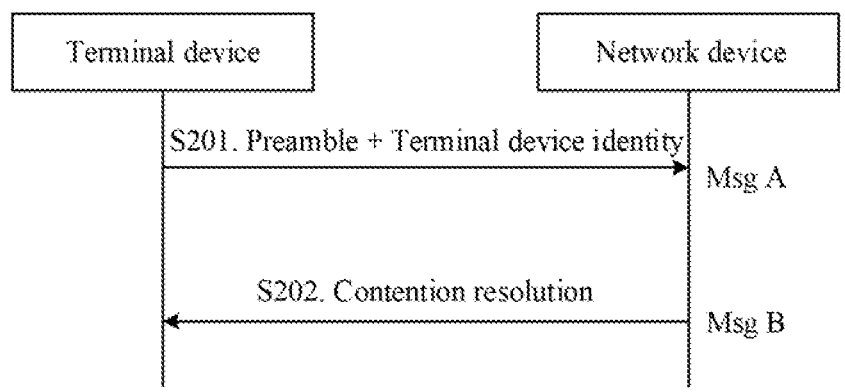
FIG. 2 illustrates a processing flowchart of a first type of RACH of the disclosure.

The above RACH process needs to be completed through four information exchanges between the network device and the terminal device, which leads to the extension of the RACH process. In order to solve the problem of the extension of the RACH process, the first type of PACH is proposed. The processing flow of the first type of PACH, as illustrated in FIG. 2, includes the following steps.

At S201, the terminal device sends an MsgA to the network device.

The MsgA consists of a Preamble and a payload. Optionally, the Preamble is the same as the Preamble in the second type of RACH, and this Preamble is transmitted on the PRACH resource. The information carried in the payload is the same as the information in the Msg3 in the second type of RACH, for example, a RRC signaling when the RRC is in an idle state, and a C-RNTI when the RRC in the connected state. The payload may be transmitted by a Physical Uplink Shared Channel (PUSCH).

The result of receiving the MsgA by the network device may include the following two situations: first, the network device successfully decodes one or more Preambles; and second, the network device successfully decodes one or more preambles and one or more payloads.

At S202, the terminal device receives an MsgB from the network device.

Optionally, the MsgB includes contents of the Msg2 and the Msg4 in the second type of RACH.

Similar to an LTE system, the NR system supports the switching process of the terminal device in the connected state. When the terminal device using a network service moves from one cell to another cell, or due to the adjustment of the wireless transmission service load, the activation operation maintenance, the device failure, etc., in order to ensure the continuity of communication and the quality of the service, the system transfers a communication link between the terminal device and the original cell to the new cell, that is, the switching, process is performed.

Taking an Xn interface switching process as an example, the cell switching process applicable to the LTE system and the NR system is divided into the following three stages.

At stage 1, switching preparation: including measurement control and reporting, a switching request and switching acknowledge message. The switching acknowledge message includes a switching command generated by a target cell, and a source cell is not allowed to make any modification for the switching command generated by the target cell and directly forwards the switching command to the terminal device.

At stage 2, switching execution: the terminal device performs the switching process immediately after receiving the switching command, that is, the terminal device is disconnected with the source cell and is connected with the target cell (for example, RACH is performed, a RRC switching completion message is sent to a target network device, etc.); and the terminal device performs Secondary Node (SN) state transfer, and data forwarding.

At stage 3, switching completion: the target cell performs a Path Switch with an Access and Mobility Management Function (AMF) and a User Port Function (UPF) to release the context of the terminal device of the source network device.

For a terminal device with single-sending and single-receiving capability, after receiving the switching command, the terminal device is disconnected with the source cell, starts to synchronize the target cell, and initiates the RACH process. After the RACH process is completed, the terminal device can perform data transmission in the target cell. During the RACH process, data transmission may be interrupted.

In a NR terrestrial network, the transmission delay between the terminal device and the network device is small, and the time required for the terminal device to perform RACH in the target cell is not long, so that the interrupted time of data transmission is also short. Compared with the terrestrial network, the transmission delay between the terminal device in the NTN and the hazard is larger. Correspondingly, the time required for the terminal device to perform RACH in the target cell is longer, so that the data interruption time in the cell switching process is greatly increased to affect the transmission performance of the terminal device.

The technical solutions of the embodiments of the disclosure may be applied to various communications systems, such as a Global System for Mobile communications (GSM), a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, an Advanced Long Term Evolution (LTE-A) system, an NR system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Worldwide Interoperability for Microwave Access (WiMAX) communications system, a Wireless Local Area Network (WLAN), Wireless Fidelity (WiFi), a next generation of communication systems, or other communication systems.

System architecture and service scenarios described in the embodiments of the disclosure are intended to describe the technical solutions in the embodiments of the disclosure more clearly, but are not intended to limit the technical solutions provided in the embodiments of the disclosure. Those of ordinary skill in the art may know that as the network architecture evolves and a new service scenario emerges, the technical solutions provided in the embodiments of the disclosure are also applicable to a similar technical problem.

The network device involved in the embodiments of the disclosure may be a common base station (NodeB (NB) or Evolutional Node B (eNB) or gNB), a New Radio controller (NR controller), a centralized unit, a new radio base station, a remote radio frequency module, a micro base station, a relay, a distributed unit, a Transmission Reception Point (TRP), a Transmission Point (TP) or any other devices. No limits are made to specific technologies and specific device forms adopted by the network device in the embodiments of the disclosure. In order to facilitate description, in all embodiments of the disclosure, the abovementioned apparatuses with a wireless communication function provided for the terminal device are collectively referred to a network device.

In the embodiments of the disclosure, the terminal device may be any terminal. For example, the terminal device may be User Equipment (UE) in Machine Type Communication (MTC). That is to say, the terminal device may also be called the UE, a Mobile Station (MS), a mobile terminal, a terminal etc. The terminal device may communicate with one or more core networks through a Radio Access Network (RAN). For example, the terminal device may be a mobile telephone (or referred to as a "cellular" telephone) and a computer with a mobile terminal. For example, the terminal device may also be a portable, pocket-sized, hand-held, computer built-in, or in-vehicle mobile apparatus, which exchanges language and/or data with the RAN. No specific limits are made thereto in the embodiments of the disclosure.

Optionally, the network device and the terminal device may be deployed on land, including indoors or outdoors, and may be held in hands or deployed in vehicles, or may be deployed on water surface, or may be deployed on an aircraft, a balloon, and an artificial satellite in the air. No limits are made to the application scenario of the network device and the terminal device in the embodiments of the disclosure.

Optionally, communications between the network device and the terminal device and between the terminal devices may be performed through a licensed spectrum, or through an unlicensed spectrum, or through the licensed spectrum and the unlicensed spectrum simultaneously. Communications between the network device and the terminal device and between the terminal devices may be performed through a spectrum below 7 gigahertz (GHz), or through a spectrum above 7 GHz, or through the spectra below 7 GHz and above 7 GHz simultaneously. No limits are made to the spectrum resource used between the network device and the terminal device in the embodiments of the disclosure.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, MTC, and Vehicle to Vehicle (V2V) communication, etc. The embodiments of the disclosure may also be applied to these communication systems.

Figure 3:
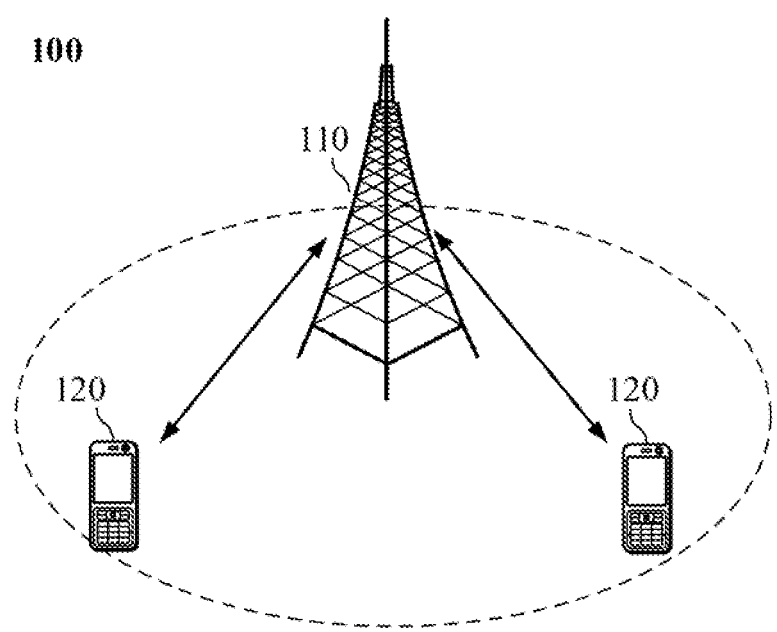
FIG. 3 illustrates a schematic structural diagram of compositions of a communication system of the embodiments of the disclosure.

Exemplarily, a communication system 100 that the embodiments of the disclosure are applied to is illustrated in FIG. 3. The communication system 100 may include a network device 110, and the network device 110 may be a device communicating with a terminal device 120 (or called a communication terminal and a terminal). The network device 110 may provide communication coverage for a specific geographical region and may communicate with a terminal device located in this coverage. Optionally, the network device 110 may be a Base Transceiver Station (BTS) in the GSM system or the CDMA system, may also be a NB in the WCDMA system, and may further be an eNB or eNodeB in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. A "terminal device" used herein includes, but not limited to: a device connected through a wired line connection, for example, through Public Switched Telephone Network (PSTN), Digital Subscriber Line (DSL), digital cable and direct cable connections; and/or another data connection/network; and/or a wireless interface, for example, for a cellular network, a Wireless Local Area Network (WLAN), a digital television network like a Digital Video Broadcasting-Handheld (DVB-H) network, a satellite network and an Amplitude Modulated-Frequency Modulated (AM-FM) broadcast transmitter; and/or a device of another terminal configured to receive/send communication signals, and/or an Internet of Things (IoT) device. The terminal device arranged to communicate through a wireless interface may be called a "wireless communication terminal", a "wireless terminal" or a "mobile terminal". Examples of a mobile terminal include, but not limited to: a satellite or cellular telephone; a Personal Communication System (PCS) terminal capable of combining a cellular radio telephone and data processing, faxing and data communication capabilities; a Personal Digital Assistant (PDA) capable of including a radio telephone, a pager, internet/intranet access, a Web browser, a notepad, a calendar and/or a Global Positioning System (GPS) receiver; and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform D2D communication.

Optionally, the 5G system or the 5G network may also be called an NR system or an NR network.

A network device and two terminal devices are exemplarily illustrated in FIG. 3. Optionally, the communication system 100 may include multiple network devices and another number of terminal devices may be included in coverage of each network device. There are no limits made thereto the embodiments of the disclosure.

Optionally, the communication system 100 may further include another network entity such as a network controller and a mobility management entity. There are no limits made thereto in the embodiments of the disclosure.

It should be understood that a device with a communication function in the network/system in the embodiments of the disclosure may be called a communication device. Taking the communication system 100 illustrated in FIG. 3 as an example, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the disclosure.

The embodiments of the disclosure provide an optional processing flow of a method for cell switching, as illustrated in FIG. 4, which includes the following operations.

At S301, in case that a terminal device performs the cell switching, the terminal device keeps an uplink in a source cell at a time other than sending a first message.

In some embodiments, the first message is an MsgA in 2-steps RACH; or, the first message is an Msg1 in 4-steps RACH.

In some embodiments, for CBRA, in case that the terminal device performs the cell switching, the terminal device not only keeps the uplink in the source cell at the time other than sending the first message, but also keeps the uplink in the source cell at the time other than sending a third message. It should be understood that, for the CBRA, in case that the terminal device performs the cell switching, the terminal device keeps the uplink in the source cell at the time other than sending the first message and sending the third message.

Herein, the third message is sent in case that an uplink grant resource indicated in the RAR reaches the terminal device. Or, the third message is sent in case that an uplink grant resource indicated in the MsgB in 2-steps RACH reaches the terminal device. In this scenario, the terminal device fails back to 4-steps RACH from 2-steps RACH.

In other embodiments, for CFRA, in case that the terminal device performs the cell switching, the terminal device only keeps the uplink in the source cell at the time other than sending the first message.

The embodiments of the disclosure provide another optional processing flow of a method for cell switching, as illustrated in FIG. 5, which includes the following operations.

At S401, in case that a terminal device performs the cell switching, the terminal device keeps a downlink in a source cell at a time other than downlink synchronization with a target cell.

In some embodiments, for CBRA, in case that the terminal device performs the cell switching, the terminal device not only keeps the downlink in the source cell at the time other than downlink synchronization with the target cell, but also keeps the downlink in the source cell at a time after the terminal device receives a second message (matched with the first message) in a RAR window or at a time after the terminal device receives the second message (matched with the first message) in an MsgB receiving window in case that a first time expires.

In some embodiments, the first timer is configured by a network device, or the first timer is determined by the terminal device. The first timer is a RAR window-offset timer in 4-steps RACH or an MsgB receiving window-offset timer in 2-steps RACH. The first message is the MsgA in 2-steps RACH, and the second message is an MsgB in 2-steps RACH. Or, the first message is the Msg1 in 4-steps RACH, and the second message is a Msg2 in 4-steps RACH;

In other embodiments, for CFRA, the terminal device only keeps the downlink in the source cell at the time other than downlink synchronization with the target cell.

Figure 6:
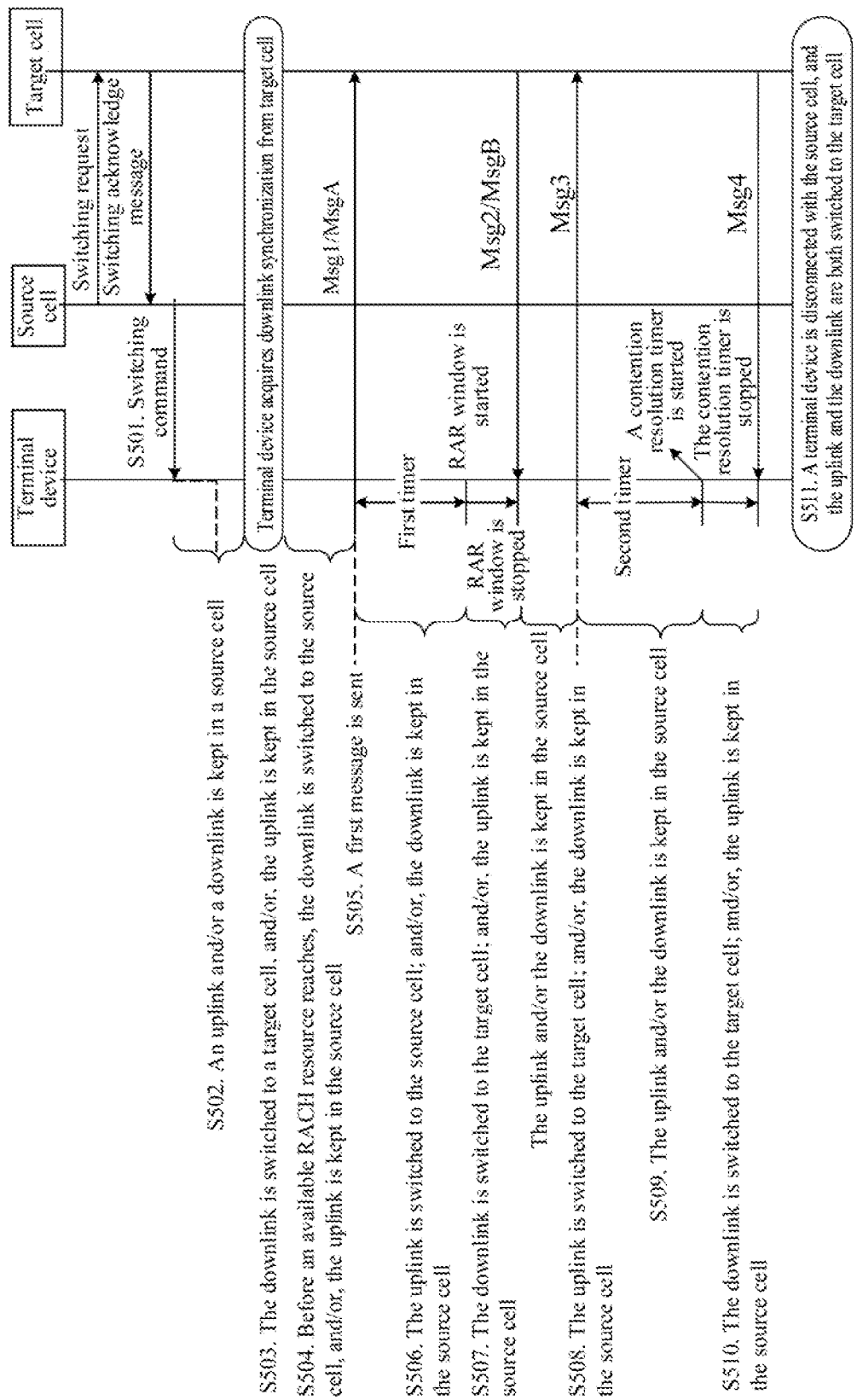
FIG. 6 illustrates an optional processing flowchart of a contention-based cell switching method of the embodiments of the disclosure.

Based on the methods for the cell switching illustrated in FIG. 4 and FIG. 5, the embodiments of the disclosure provide an optional processing flow of a contention-based cell switching method provided by the embodiments of the disclosure, as illustrated in FIG. 6, which includes the following operations.

At S501, a terminal device receives a switching command from a source cell, and the terminal device performs the cell switching based on CBRA.

The conditions for the terminal device to perform cell switching based on CBRA include that: no dedicated RACH resource is configured in the switching command; or a dedicated RACH resource is configured in the switching command, but there is no beam satisfying preconfigured conditions in a beam associated with the dedicated RACH resource.

In the embodiments of the disclosure, before the source cell sends the switching command, the source cell sends a switching request to a target cell, and the target cell sends a switching acknowledge message including the switching command to the source cell.

At S502, before downlink synchronization with the target cell, the terminal device keeps an uplink in the source cell, and/or, the terminal device keeps a downlink in the source cell.

At S503, during downlink synchronization with the target cell, the terminal device keeps the uplink in the source cell, and/or, the terminal device switches the downlink to the target cell.

At S504, after downlink synchronization with the target cell, and before an available RACE resource reaches the terminal device, the terminal device switches the downlink to the source cell, and/or, the terminal device keeps the uplink in the source cell.

At S505, after downlink synchronization with the target cell, and in case that the available RACH resource reaches the terminal device, the terminal device sends a first message to the target cell.

Herein, the first message is an MsgA in 2-steps RACH; or, the first message is an Msg1 in 4-steps RACH.

At S506, the terminal device starts a first timer. During the operation of the first timer, the terminal device switches the uplink to the source cell, and/or, the terminal device keeps the downlink in the source cell.

In some embodiments, during the operation of the first timer, the terminal device does not need to monitor a PDCCH of the target cell, so that the downlink can be kept in the source cell, and the uplink is switched to the source cell.

In some embodiments, the first timer is configured by a network device, or the first timer is determined by the terminal device. The first timer may be a RAR window-offset timer in 4-steps RACH or an MsgB receiving window-offset timer in 2-steps RACH.

At S507, in case that the first timer expires, the terminal device switches the downlink to the target cell, and/or, the terminal device keeps the uplink in the source cell.

In some embodiments, in case that the first timer expires, the terminal device receives the MsgB or Msg2, so that the terminal device starts an MsgB receiving window or RAR window, and the terminal device switches the downlink to the target cell, and/or, the terminal device keeps the uplink in the source cell.

At S508, in case that the terminal device receives a RAR (matched with the first message) in a RAR window or an MsgB receiving window, the terminal device switches the downlink to the source cell, and/or, the terminal device switches the uplink to the target cell.

In some embodiments, when the uplink grant resource indicated in the RAR reaches the terminal device, the terminal device sends the Msg3 to the target cell. It should be understood that, when sending the Msg3 (third message), the terminal device keeps the uplink in the target cell. Herein, the terminal device keeps the uplink in the source cell at the time other than sending the third message.

At S509, the terminal device starts a second timer. During the operation of the second timer, the terminal device switches the uplink to the source cell, and/or, the terminal device keeps the downlink in the source cell.

In some embodiments, during the operation of the second timer, the terminal device does not need to monitor the PDCCH of the target cell, so that the downlink can be kept in the source cell, and the uplink is switched to the source cell.

In some embodiments, the second timer is configured by the network device, or the second timer is determined by the terminal device. The second timer may be a Contention Resolution-offset timer.

At S510, in case that the second timer expires, the terminal device switches the downlink to the target cell, and/or, the terminal device keeps the uplink in the source cell.

In some embodiments, in case that the second timer expires, the terminal device needs to monitor an Msg4, and the terminal starts a contention resolution timer.

At S511, in case that the terminal device receives a fourth message during the operation of the contention resolution timer, and the contention resolution is successful, the terminal device keeps the downlink in the target cell, and/or, the terminal device switches the uplink to the target cell.

In some embodiments, the fourth message is the Msg4 in 4-steps RACH.

In the embodiments of the disclosure, based on the contention-based cell switching method illustrated in FIG. 6, in the process of performing cell switching by the terminal device, the terminal device switches the uplink to the target cell only at the moments for sending the Msg1, the MsgA and the Msg3, and keeps the uplink in the source cell at the time other than sending the Msg1, the MsgA and the Msg3. During the process of downlink synchronization with the target cell, the terminal device switches the downlink to the target cell at the time that the Msg2 (matched with the Msg1) is not received in the RAR window and at the time that the MsgB (matched with the MsgA) is not received in the MsgB receiving window. During the process of downlink synchronization with the target cell, the terminal device keeps the downlink to in the source cell at a time after a time that the Msg2 matched with the Msg1 is received in the RAR window and at a time after a time that the MsgB matched with the MsgA is received in the MsgB receiving window. In this way, through the waiting time of the RACH process for the target cell, the terminal device keeps the uplink and/or downlink with the source cell to realize uplink and/or downlink data transmission with the source cell, thereby reducing the interrupted time of data transmission and improving the efficiency of service processing.

Figure 7:
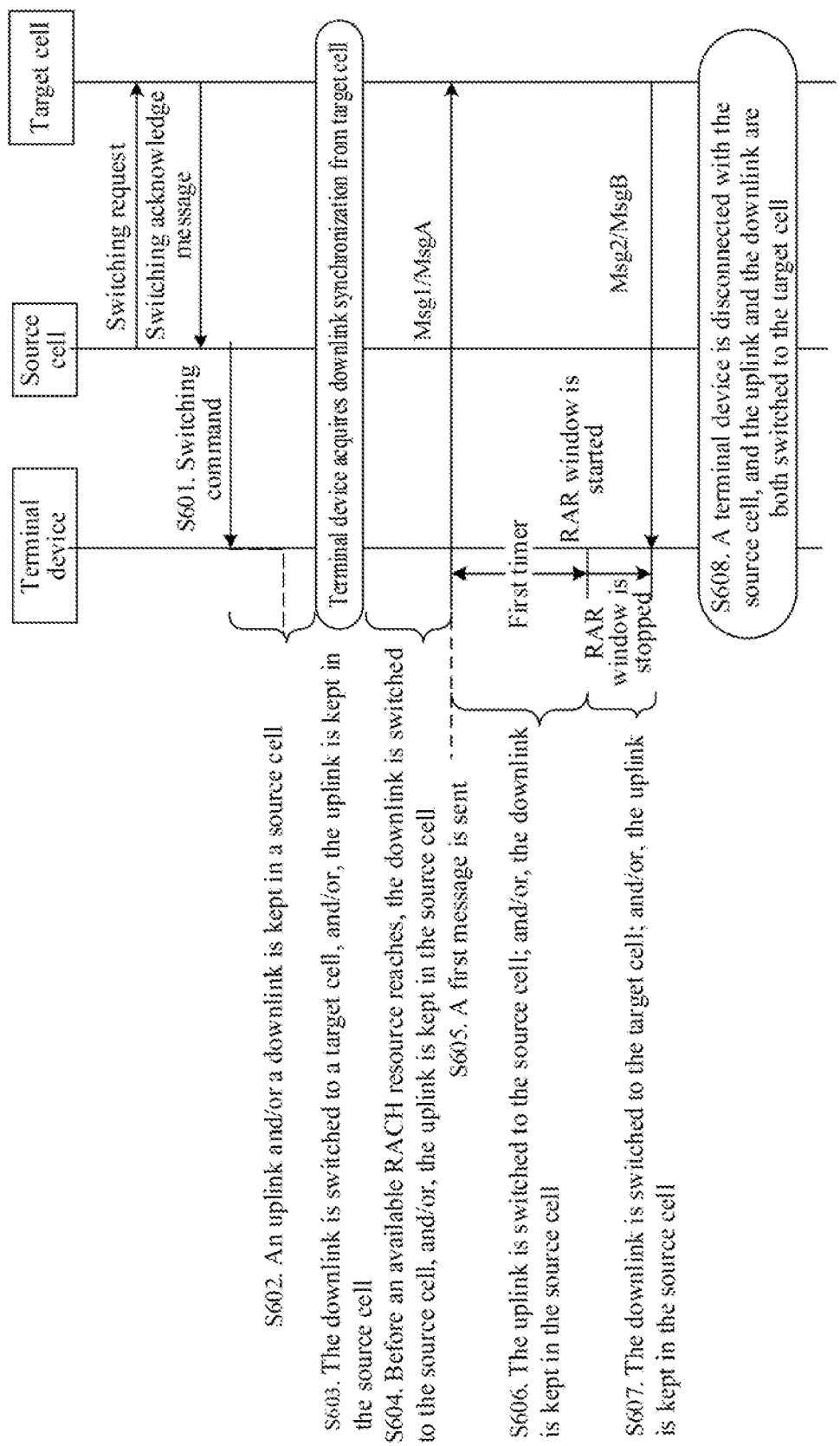
FIG. 7 illustrates an optional processing flowchart of a contention-free cell switching method of the embodiments of the disclosure.

Based on the method for the cell switching illustrated in FIG. 4 and FIG. 5, the embodiments of the disclosure provide a contention-free-based cell switching method, as illustrated in FIG. 7, which includes the following operations.

At S601, a terminal device receives a switching command from a source cell, and the terminal device performs the cell switching based on CFRA.

In some embodiments, the conditions for the terminal device to perform cell switching based on CFRA include that: a dedicated RACH resource is configured in the switching command, and there is a beam satisfying preconfigured conditions in beams associated with the dedicated RACH resource.

In the embodiments of the disclosure, before the source cell sends the switching command, the source cell sends a switching request to a target cell, and the target cell sends a switching acknowledge message including the switching command to the source cell.

At S602, before downlink synchronization with the target cell, the terminal device keeps an uplink in the source cell, and/or, the terminal device keeps a downlink in the source cell.

At S603, during downlink synchronization with the target cell, the terminal device keeps the uplink in the source cell, and/or, the terminal device switches the downlink to the target cell.

At S604, after downlink synchronization with the target cell, and before an available RACH resource reaches the terminal device, the terminal device switches the downlink to the source cell, and/or, the terminal device keeps the uplink in the source cell.

At S605, after downlink synchronization with the target cell, and in case that the available RACH resource reaches the terminal device, the terminal device sends a first message to the target cell.

Herein, the first message is an MsgA in 2-steps RACH; or, the first message is a Msg1 in 4-steps RACH.

At S606, the terminal device starts a first timer. During the operation of the first timer, the terminal device switches the uplink to the source cell, and/or, the terminal device keeps the downlink in the source cell.

In some embodiments, during the operation of the first timer, the terminal device does not need to monitor a PDCCH of the target cell, so that the downlink can be kept in the source cell, and the uplink is switched to the source cell.

In some embodiments, the first timer is configured by a network device, or the first timer is determined by the terminal device. The first timer may be a RAR window-offset timer in 4-steps RACH or an MsgB receiving window-offset timer in 2-steps RACH.

At S607, in case that the first timer expires, the terminal device switches the downlink to the target cell, and/or, the terminal device keeps the uplink in the source cell.

In some embodiments, in case that the first timer expires, the terminal device receives the MsgB or Msg2, so that the terminal device starts an MsgB receiving window or RAR window, and the terminal device switches the downlink to the target cell, and/or, the terminal device keeps the uplink in the source cell.

At S608, in case that the terminal device receives a RAR matched with the first message in a RAR window or an MsgB receiving window, and the RACH is successful, the terminal device is disconnected with the source cell and switches the uplink and the downlink to the target cell.

In the embodiments of the disclosure, based on the contention-free-based cell switching method illustrated in FIG. 7, in the process of performing cell switching by the terminal device, the terminal device switches the uplink to the target cell only at the moments for sending the Msg1, the MsgA and the Msg3, and keeps the uplink in the source cell at the time other than sending the Msg1, the MsgA and the Msg3. During the processes of downlink synchronization with the target cell, the operation of the RAR window and the operation of the MsgB receiving window, the terminal device switches the downlink to the target cell. During the process of downlink synchronization with the target cell, the terminal device keeps the downlink to in the source cell at the time other than the RAR window and the MsgB receiving window.

It is to be noted that, in the above embodiments of the disclosure, the operations that the terminal device switches the uplink to the source cell or keeps the uplink in the source cell may include at least one of the following.

The terminal device may directly transmit the PUSCH by using the uplink resource (configured grant) preconfigured by the source cell. The terminal device transmits the PUSCH by using the uplink resource dynamically scheduled by the previously received PDCCH, and may still transmit a Physical Uplink Control Channel (PUCCH), such as the transmission of Channel State Information (CSI), Acknowledgment/Non-Acknowledgement (ACK/NACK) feedback, and the like.

It is to be noted that, in the above embodiments of the disclosure, the operation that the terminal device switches the downlink to the source cell or keep the downlink in the source cell may include that: the terminal device may directly receive the PDSCH by using a Semi-Persistent Scheduling (SPS) resource of the source cell, and/or the terminal device receives the PDSCH dynamically scheduled by the PDCCH.

It is to be noted that, sending of the source cell involved in the above embodiments of the disclosure may be performed by a source network device corresponding to the source cell. Sending of the target cell involved in the above embodiments of the disclosure may be performed bye a target network device corresponding to the target cell. Sending to the source cell involved in the above embodiments of the disclosure may be sent to the source network device corresponding to the source cell. Sending to the target cell involved in the above-mentioned embodiments of the disclosure may be sent to the target network device corresponding to the target cell.

It should be understood that, in various embodiments of the disclosure, the size of the sequence numbers of the above processes does not mean the order of execution, and the execution order of the processes may be determined by functions and internal logic, and may not constitute any limitation on the implementation process of the embodiments of the disclosure.

Figure 8:
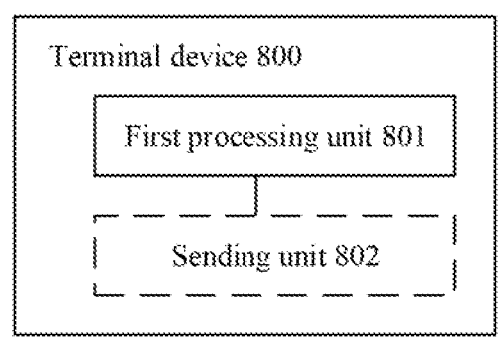
FIG. 8 illustrates an optional schematic structural diagram of compositions of a terminal device of the embodiments of the disclosure.

In order to implement the above method for the cell switching, the embodiments of the disclosure provide a terminal device. An optional schematic structural diagram of compositions of the terminal device 800, as illustrated in FIG. 8, includes: a first processing unit 801.

The first processing unit 801 is configured to enable the terminal device to keep an uplink in a source cell at a time other than sending a first message in case that the terminal device performs the cell switching.

In some embodiments, the first processing unit 801 is configured to: before downlink synchronization with a target cell, keep the uplink in the source cell, and/or, keep a downlink in the source cell.

The first processing unit 801 is configured to: keep the uplink in the source cell, and/or, switch the downlink to the target cell.

In some embodiments, the first processing unit 801 is configured to: after downlink synchronization with the target cell, and before an available RACH resource reaches the terminal device, switch the downlink to the source cell, and/or, keep the uplink in the source cell.

In some embodiments, the terminal device 800 further includes a sending unit 802, configured to send the first message to the target cell after downlink synchronization with the target cell and in case that the available RACH resource reaches the terminal device.

In some embodiments, the first processing unit 801 is configured to start a first timer.

In some embodiments, the first processing unit 801 is configured to: during the operation of the first timer, enable the terminal device to switch the uplink to the source cell, and/or, enable the terminal device to keep the downlink in the source cell.

In some embodiments, the first processing unit 801 is configured to: in case that the first timer expires, switch the downlink to the target cell, and/or, keep the uplink in the source cell.

In some embodiments, the first processing unit 801 is configured to: in case that the first timer expires, and the terminal device receives a second message (matched with the first message) in a RAR window or an MsgB receiving window, switch the downlink to the target cell, and/or, enable the terminal device to keep the uplink in the target cell.

In some embodiments, the second message is an MsgB in 2-steps RACH; or, the second message is an Msg2 in 4-steps RACH.

In some embodiments, the first timer is configured by a network device; or, the first timer is determined by the terminal device.

In some embodiments, the first timer is a RAR window-offset timer or an MsgB receiving window-offset timer.

In some embodiments, the first processing unit 801 is further configured to: switch the downlink to the source cell in case that the terminal device receives the RAR matched with the first message in the RAR window; or, switch the downlink to the source cell in case that the terminal device receives the MsgB matched with the first message in the MsgB receiving window.

In some embodiments, the first processing unit 801 is further configured to: switch the uplink to the target cell in case that the terminal device receives the RAR matched with the first message in the RAR window; or, switch the uplink to the target cell in case that the terminal device receives the MsgB matched with the first message in the MsgB receiving window.

In some embodiments, the first processing unit 801 is further configured to enable the terminal device to keep the uplink in the source cell at a time other than sending a third message; and the third message is sent in case that an uplink grant resource indicated in the RAR or MsgB reaches the terminal device.

In some embodiments, the third message is an Msg3 in 4-steps RACH.

In some embodiments, the first processing unit 801 is further configured to start a second timer.

In some embodiments, the first processing unit 801 is further configured to: during the operation of the second timer, switch the uplink to the source cell, and/or, keep the downlink in the source cell.

In some embodiments, the first processing unit 801 is further configured to: in case that the second timer expires, switch the downlink to the target cell, and/or, keep the uplink in the source cell.

In some embodiments, the first processing unit 801 is further configured to: in case that the second timer expires, the terminal device receives a fourth message during the operation of a contention resolution timer, and the contention resolution is successful, keep the downlink in the target cell, and/or, switch the uplink to the target cell.

In some embodiments, the fourth message is an Msg4 in 4-steps RACH.

In some embodiments, the second timer is configured by the network device; or, the second timer is determined by the terminal device.

In some embodiments, the second timer is a Contention Resolution-offset timer.

In some embodiments, the first message is an MsgA in 2-steps RACH; or, the first message is an Msg1 in 4-steps RACH.

Figure 9:
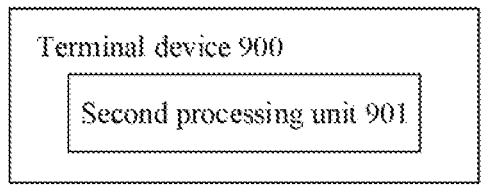
FIG. 9 illustrates another optional schematic structural diagram of compositions of a terminal device of the embodiments of the disclosure.

In order to implement the above method for the cell switching, the embodiments of the disclosure provide another terminal device. An optional schematic structural diagram of compositions of the terminal device 900, as illustrated in FIG. 9, includes: a second processing unit 901.

The second processing unit 901 is configured to: keep a downlink in a source cell at a time other than downlink synchronization with a target cell in case that the terminal device performs the cell switching.

In some embodiments, the second processing unit 901 is configured to keep the downlink in the source cell before downlink synchronization with the target cell.

In some embodiments, the second processing unit 901 is configured to switch the downlink to the source cell after downlink synchronization with the target cell, and before an available RACH resource reaches the terminal device.

In some embodiments, the second processing unit 901 is further configured to start a first timer.

In some embodiments, the second processing unit 901 is configured to keep the downlink in the source cell during the operation of the first timer.

In some embodiments, in case that the first timer expires, the second processing unit 901 is configured to keep the downlink in the source cell at a time after the terminal device receives a second message matched with the first message in a RAR window or an MsgB receiving window.

In some embodiments, the first message is an MsgA in 2-steps RACH and the second message is an MsgB in 2-steps RACH; or, the first message is an Msg1 in 4-steps RACH and the second message is an Msg2 in 4-steps RACH.

In some embodiments, the first timer is configured by a network device; or, the first timer is determined by the terminal device.

In some embodiments, the first timer is a RAR window-offset timer or an MsgB receiving window-offset timer.

In some embodiments, the second processing unit 901 is further configured to start a second timer.

In some embodiments, the second processing unit 901 is configured to keep the downlink in the source cell during the operation of the second timer.

In some embodiments, the second timer is configured by the network device; or, the second timer is determined by the terminal device.

In some embodiments, the second timer is a Contention Resolution-offset timer.

The embodiments of the disclosure provide a terminal device, which includes: a processor and a memory configured to store a computer program runnable on the processor. Herein, the processor is configured to perform the operations of the method for the cell switching executed by the terminal device when running the computer program.

The embodiments of the disclosure provide a chip, which includes: a processor, configured to call and run a computer program from a memory to enable a device installed with the chip to perform the method for the cell switching executed by the terminal device.

The embodiments of the disclosure provide a storage medium having stored thereon an executable program that when executed by a processor, implements the method for the cell switching executed by the terminal device.

The embodiments of the disclosure provide a computer program product, which includes; a computer program instruction that enables a computer to perform the method for the cell switching executed by the terminal device.

The embodiments of the disclosure provide a computer program that enables a computer to perform the method for the cell switching executed by the terminal device.

Figure 10:
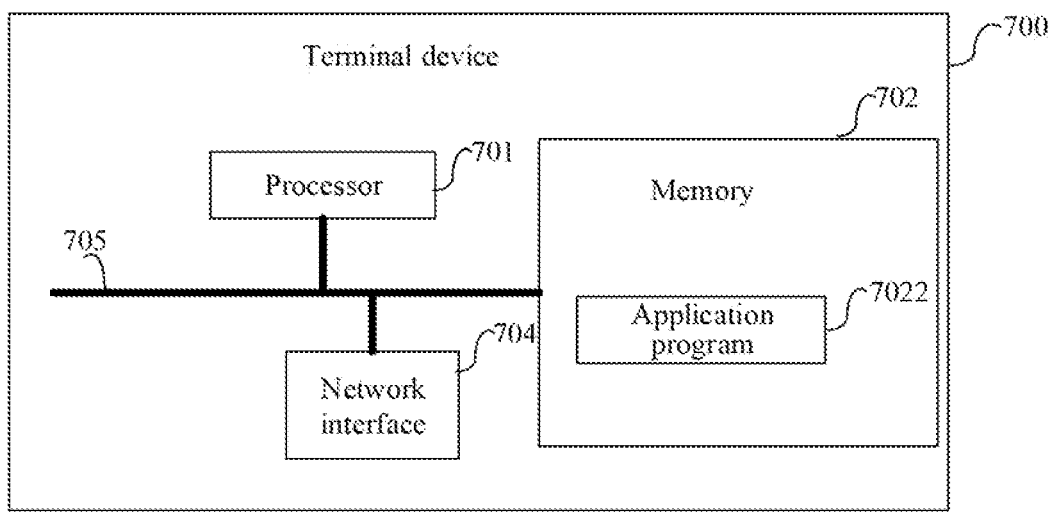
FIG. 10 illustrates a schematic structural diagram of hardware compositions of a terminal device of the embodiments of the disclosure.

FIG. 10 illustrates a schematic structural diagram of hardware compositions of a terminal device of an embodiment of the disclosure. The terminal device 700 includes: at least one processor 701, a memory 702 and at least one network interface 704. Various components of the terminal device 700 are coupled together through a bus system 705. It may be understood that the bus system 705 is configured to implement connection and communication between these components. The bus system 705 further includes: a power bus, a control bus, and a status signal bus except a data bus. However, for clarity of description, various buses are marked as the bus system 705 in FIG. 10.

It should be understood that the memory 702 may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disk or a Compact Disc Read-Only Memory (CD-ROM); and the magnetic surface memory may be a magnetic disk memory or a magnetic tape memory. The volatile memory may be a Random Access Memory (RAM) that acts as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiment of the disclosure is intended to include, but is not limited to, these and any other suitable types of memories.

The memory 702 in the embodiment of the disclosure is configured to store various types of data to support operations of the terminal device 700. Examples of such data include: any computer application operated on the terminal device 700, such as an application program 7022. A program for implementing the method in the embodiment of the disclosure may be included in the application program 7022.

The method disclosed in the abovementioned embodiment of the disclosure may be applied to the processor 701, or may be implemented by the processor 701. The processor 701 may be an integrated circuit chip with signal processing capability. During implementation, the operations of the foregoing method can be completed by hardware integrated logic circuits in the processor 701 or instructions in the form of software. The above-mentioned processor 701 may be a general-purpose processor, a Digital Signal Processor (DSP), or other programmable logic devices, discrete gate or transistor logic devices, discrete hardware components, or the like. The processor 701 may implement or perform various methods, steps, and logical block diagrams disclosed in the embodiments of the disclosure. The general-purpose processor may be a microprocessor, or any conventional processor. Steps of the methods disclosed with reference to the embodiments of the disclosure may be directly performed and accomplished by a hardware decoding processor, or may be performed and accomplished by a combination of hardware and software modules in the decoding processor. A software module may be located in a storage medium. The storage medium is located in the memory 702, and the processor 701 reads information in the memory 702 and completes the steps of the foregoing method in combination with hardware thereof.

In an exemplary embodiment, the terminal device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the foregoing methods.

The present disclosure is described with reference to flowcharts and/or block diagrams of the method, the device (system) and the computer program product according to the embodiments of the present disclosure. It should be understood that each flow and/or each block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide steps of achieving the functions designated in one or more flows of the flowcharts and/or one or more blocks of the block diagrams.

It should be understood that the terms "system" and "network" in the disclosure are often used interchangeably herein. The term "and/or" in this disclosure describes only an association relationship for describing associated objects and represents that three relationships may exist. For example, A and/or B may represent the following three cases: Only A exists, both A and B exist, and only B exists. In addition, the character "/" in the disclosure generally indicates an "or" relationship between the associated objects.

The description above is only the preferred embodiment of the disclosure and is not intended to limit the scope of protection of the disclosure. Any modifications, equivalent replacements, improvements and the like made within the spirit and principle of the disclosure shall fall within the scope of protection of the disclosure.

The invention claimed is:

1. A method for a cell switching, comprising:
in case that a terminal device performs the cell switching, keeping, by the terminal device, an uplink in a source cell at a time other than sending a first message;
wherein the method further comprises:
starting, by the terminal device, a first timer;
in case that the first timer expires and the terminal device receives a second message, matched with the first message, in a random access response window or a message B (MsgB) receiving window, switching, by the terminal device, a downlink to the target cell;
starting, by the terminal device, a second timer; and
in case that the second timer expires and the terminal device receives a fourth message during an operation of a contention resolution timer, and a contention resolution is successful, switching by the terminal device, the uplink to the target cell, wherein the fourth message is a message 4 (Msg4) in 4-steps random access channel.

2. The method of claim 1, further comprising:
before downlink synchronization with a target cell, keeping, by the terminal device, the uplink in the source cell, and/or, keeping, by the terminal device, the downlink in the source cell; or
during downlink synchronization with the target cell, keeping, by the terminal device, the uplink in the source cell, and/or, switching, by the terminal device, the downlink to the target cell.

3. The method of claim 1, further comprising:
after downlink synchronization with the target cell, and before an available random access channel resource reaches the terminal device, switching, by the terminal device, the downlink to the source cell, and/or, keeping, by the terminal device, the uplink in the source cell; or
after downlink synchronization with the target cell, and in case that the available random access channel resource reaches the terminal device, sending, by the terminal device, the first message to the target cell.

4. The method of claim 1, further comprising:
during an operation of the first timer, switching, by the terminal device, the uplink to the source cell, and/or, keeping, by the terminal device, the downlink in the source cell.

5. The method of claim 1, wherein the second message is an MsgB in 2-steps random access channel or a message 2 (Msg2) in 4-steps random access channel.

6. The method of claim 1, wherein the first timer is configured by a network device or determined by the terminal device; and
wherein the first timer is a Random Access Response (RAR) window-offset timer or an MsgB receiving window-offset timer.

7. The method of claim 5, further comprising:
in case that the terminal device receives a random access response, matched with the first message, in a random access response window, or the terminal device receives an MsgB, matched with the first message, in an MsgB receiving window, switching, by the terminal device, the downlink to the source cell; and/or
in case that the terminal device receives the random access response, matched with the first message, in the random access response window, or the terminal device receives the MsgB, matched with the first message, in the MsgB receiving window, switching, by the terminal device, the uplink to the target cell.

8. The method of claim 7, further comprising:
keeping, by the terminal device, the uplink in the source cell at a time other than sending a third message; and
wherein the third message is sent in case that an uplink grant resource indicated in the random access response or the MsgB reaches the terminal device;
wherein the third message is a message 3 (Msg3) in 4-steps random access channel.

9. The method of claim 1, further comprising:
during an operation of the second timer, switching, by the terminal device, the uplink to the source cell, and/or, keeping, by the terminal device, the downlink in the source cell.

10. The method of claim 9, wherein in case that the second timer expires, the method further comprises:
switching, by the terminal device, the downlink to the target cell;
and/or, keeping, by the terminal device, the uplink in the source cell.

11. The method of claim 9, wherein the second timer is configured by a network device or determined by the terminal device; and
wherein the second timer is a contention resolution-offset timer.

12. The method of claim 1, wherein the first message is a message A (MsgA) in 2-steps random access channel;
or, the first message is a message 1 (Msg1) in 4-steps random access channel.

13. A method for a cell switching, applied to a base station, comprising that:
in case that a terminal device performs the cell switching, an uplink is kept in a source cell at a time other than receiving a first message;
wherein the method further comprises:
configuring, by the base station, a first timer;
wherein in case that the first timer expires, and in case that the terminal device receives a second message, matched with the first message, in a random access response window or a message B (MsgB) receiving window, a downlink is switched to the target cell;
configuring, by the base station, a second timer; and
in case that the second timer expires and the terminal device receives a fourth message during an operation of a contention resolution timer, and a contention resolution is successful, the uplink is switched to the target cell, wherein the fourth message is a message 4 (Msg4) in 4-steps random access channel.

14. The method of claim 13, wherein
before the terminal device synchronizes downlink with a target cell, the uplink is kept in the source cell, and/or, the downlink is kept in the source cell; or
during the terminal device synchronizes downlink with the target cell, the uplink is kept in the source cell, and/or, the downlink is switched to the target cell; or
after the terminal device synchronizes downlink with the target cell, and before an available random access channel resource reaches the terminal device, the downlink is switched to the source cell, and/or, the uplink is kept in the source cell; or
after the terminal device synchronizes downlink with the target cell, and in case that the available random access channel resource reaches the terminal device, receiving, by the base station, the first message from the terminal device.

15. The method of claim 13, wherein during an operation of the first timer, the uplink is switched to the source cell, and/or, the downlink is kept in the source cell;
wherein the second message is an MsgB in 2-steps random access channel or a message 2 (Msg2) in 4-steps random access channel.

16. A terminal device, comprising:
a processor;
a memory configured to store a computer-executable instruction; and
a network interface;
wherein the processor is configured to:
enable the terminal device to keep an uplink in a source cell at a time other than sending a first message in case that the terminal device performs a cell switching;
wherein the processor is further configured to:
start a first timer;
in case that the first timer expires and the terminal device receives a second message, matched with the first message, in a random access response window or a message B (MsgB) receiving window, enable the terminal device to switch a downlink to the target cell;
start a second timer; and
in case that the second timer expires and the terminal device receives a fourth message during an operation of a contention resolution timer, and a contention resolution is successful, enable the terminal device to switch the uplink to the target cell, wherein the fourth message is a message 4 (Msg4) in 4-steps random access channel.

17. The terminal device of claim 16, wherein the processor is configured to:
before downlink synchronization with a target cell, keep the uplink in the source cell, and/or, keep the downlink in the source cell; or
during downlink synchronization with the target cell, keep the uplink in the source cell, and/or, switch the downlink to the target cell.

18. The terminal device of claim 16, wherein the processor is configured to:
after downlink synchronization with the target cell, and before an available random access channel resource reaches the terminal device, switch the downlink to the source cell, and/or, keep the uplink in the source cell; or
send, through the network interface, the first message to the target cell after downlink synchronization with the target cell and in case that the available random access channel resource reaches the terminal device.

19. The terminal device of claim 16, wherein the processor is configured to:
during an operation of the first timer, enable the terminal device to switch the uplink to the source cell, and/or, enable the terminal device to keep the downlink in the source cell; wherein the second message is an MsgB in 2-steps random access channel; or, the second message is a message 2 (Msg2) in 4-steps random access channel.

20. A base station, comprising a processor and a memory configured to store a computer program runnable on the processor, wherein
the processor is configured to perform the steps of the method for the cell switching of claim 13 when running the computer program.

* * * * *